G. S. WELCH.
OVEN.
APPLICATION FILED JAN. 30, 1913.

1,119,737.

Patented Dec. 1, 1914.

Witnesses
Inventor
George S. Welch

UNITED STATES PATENT OFFICE.

GEORGE S. WELCH, OF CHICAGO, ILLINOIS.

OVEN.

1,119,737.

Specification of Letters Patent.

Patented Dec. 1, 1914.

Application filed January 30, 1913. Serial No. 745,292.

*To all whom it may concern:*

Be it known that I, GEORGE S. WELCH, a citizen of the United States, residing at Chicago, in the county of Cook and State of Illinois, have invented a certain new and useful Improvement in Ovens, of which the following is a full, clear, concise, and exact description, reference being had to the accompanying drawings, forming a part of this specification.

My invention relates to ovens and has for its object the provision of an improved style of oven in which articles may be placed to be subject to the heat within the oven, which heat is initially applied to the oven so as to raise the interior thereof to a certain temperature, whereafter the supply of heat may be discontinued, the walls of the oven being of such a character as to retain the heat within the interior of said oven to permit the heating process resulting in cooking or whatever may be desired to be carried on without the influx of additional heat.

In one form of my invention, I utilize an oven structure in which all of the walls thereof may be suitably of heat insulating material, which oven has at its lower portion a slide also preferably of heat insulating material which may be opened to permit heat to enter the oven, which heat may be supplied in any suitable way, as for instance by a gas burner. After the temperature within the oven has reached the required amount, the slide is closed and the heating and consequent cooking process continues so long as the temperature within the oven remains above a given amount. On account of the heat insulating characteristics of the oven the temperature of course remains above this predetermined amount sufficiently to effect such cooking process as may be necessary.

I will describe certain forms of carrying out my invention more in detail by referring to the accompanying drawings, in which—

Figure 1:
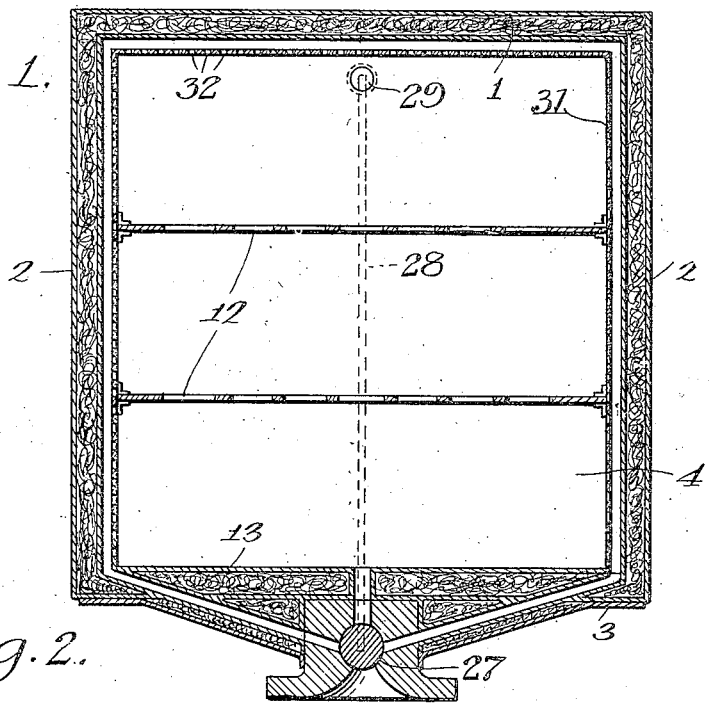
Figure 2:
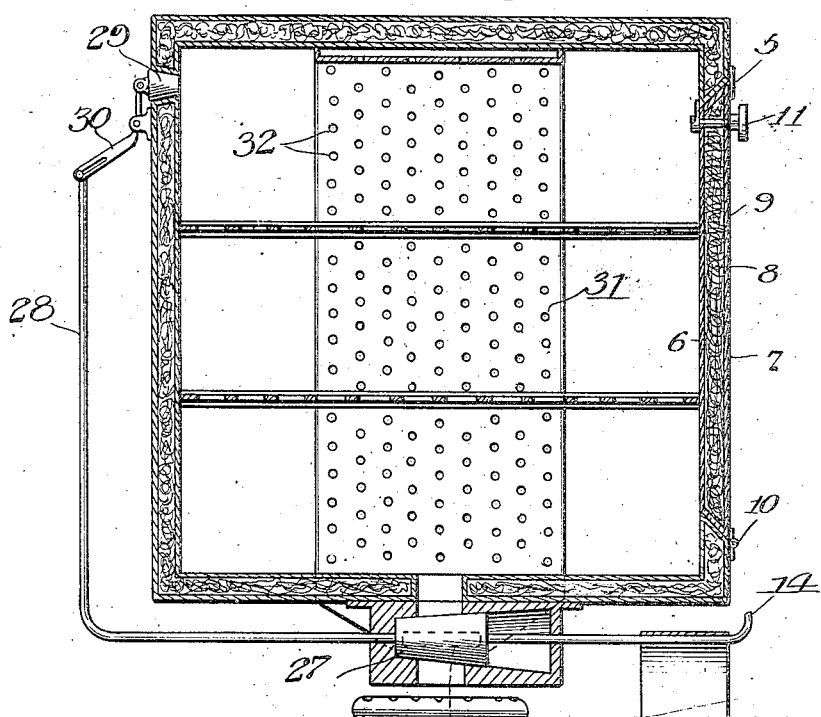

Figures 1 and 2 are vertical sections at right angles respectively of one form of my invention.

Referring more particularly to Fig. 1, I show an oven having the top wall 1, side walls 2, bottom wall 3, an end wall 4, and front wall 5, which together with the wall opposite to the wall 4 are adapted to provide an oven structure preferably rectangular in shape. Each of the walls consists of two sheets of metal 6 and 7 between which heat insulating material 8 is provided so as to maintain a given temperature within the interior of the oven structure. A door 9 is provided hinged at 10 and has a locking handle 11 so that articles may be suitably introduced and placed within the oven upon shelves 12, 12. A slide 27 is adapted to be drawn toward the left by means of the handle 14, thus providing an opening in the bottom wall of the oven through which heat may enter the interior of the oven, which heat might be suitably supplied by a gas burner 15.

In the operation of the device the slide 27 is closed, whereupon the burner 15 is started in operation, whereafter the slide is then opened to permit the heat to enter the oven. After the temperature within the oven has risen sufficiently, then the slide is closed and the operation of the burner discontinued, the temperature within the oven remaining at least above a predetermined amount on account of the heat insulating characteristics of the walls forming the oven. In this way the burner is in operation but a very short period of time to the end that economy in fuel consumption may be practised. This slide 27 as stated controls the flow of heat caused by the burner 15 into the interior of the oven, and this slide 27 also when moving carries with it, through the agency of the arm 28, a valve 29 mounted upon a bell crank lever 30. Thus when the heat is entering the oven the valve 29 may permit products of combustion to be carried away and when the slide 27 closes the aperture to the interior of the oven, then the valve 29 also is closed. A conducting tube 31 having holes 32 at its upper extremity has a width somewhat less than the width of the wall of the oven and conducts the heat from the seat of the slide 27 to the upper end of the oven, the openings of this tube 31 being likewise controlled by this slide 27.

From what has been described it is thought the essential features of my invention will be readily apparent to those skilled in the art, as will also be readily apparent that many modifications may be made without departing from its spirit.

Having however thus described certain forms in which my invention may be carried out, what I claim as new and desire to secure by Letters Patent is:

An oven structure having heat insulated walls, heat distributing ducts leading from the lower part of the oven and respectively discharging thereinto at the bottom, sides and top thereof, an outlet in communication with the oven, and simultaneously operable means for governing said ducts and outlet.

In witness whereof, I hereunto subscribe my name this 14th day of January, A. D., 1913.

GEORGE S. WELCH.

Witnesses:
 MAX W. ZABEL.
 H. A. JONES.